(12) United States Patent  
Tuohimaa et al.

(10) Patent No.: US 7,114,859 B1  
(45) Date of Patent: Oct. 3, 2006

(54) ELECTRICAL-OPTICAL/OPTICAL-ELECTRICAL BOARD TO BOARD CONNECTOR

(75) Inventors: Marko Tuohimaa, Turku (FI); Jan H. Fahllund, Turku (FI); Tero O. Suomalainen, Turku (FI); Kai Silvennoinen, Lieto (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/141,842

(22) Filed: May 31, 2005

(51) Int. Cl.
  *G02B 6/36* (2006.01)
(52) U.S. Cl. .............................. 385/89; 385/42; 385/56
(58) Field of Classification Search ................. 385/41, 385/42, 56, 88–94; 250/551; 257/81, 89, 257/100, 433, 434, 678; 361/728–745, 752–759
  See application file for complete search history.

(56) References Cited

U.S. PATENT DOCUMENTS

| 4,595,839 A | * | 6/1986 | Braun et al. ................. 250/551 |
| 4,902,092 A | * | 2/1990 | Grandy ......................... 385/56 |

\* cited by examiner

*Primary Examiner*—Phan Palmer
(74) *Attorney, Agent, or Firm*—Harrington & Smith,LLP

(57) ABSTRACT

A connector pair formed of a receptacle having an inner cavity about which is arranged a plurality of contact springs each of which is coupled to a corresponding one of a plurality of external contacts, and a plug having a plurality of contact pads upon an outer surface of the plug, and a vertical cavity surface emitting laser (VCSEL) coupled to the plurality of contact pads and at least one optical fiber wherein a portion of the plug occupies a portion of the inner cavity such that at least one of the plurality of contact pads is coupled to at least one of the contact springs.

21 Claims, 5 Drawing Sheets

ELECTRICAL-OPTICAL/OPTICAL-ELECTRICAL BOARD TO BOARD CONNECTOR

TECHNICAL FIELD

This invention relates generally to a connector pair for performing electrical-optical (EO)/optical-electrical (OE) signal conversion. More particularly, the invention relates to a connector formed of a plug and receptacle for translating between electrical and optical signals.

BACKGROUND

In many instances, coaxial cable is the transmission medium of choice for high-speed electronic applications. Often times, micro coax cable connectors (MCCC) are utilized to form a bridge between coaxial elements, such as wires or cables, and printed wiring boards (PWB). The controlled impedance, low crosstalk and EMI/RFI (electromagnetic interference/radiofrequency interference) shielding offered by coaxial cable are the driving forces for its selection for such applications. Such shielding is of particular importance when used in wireless communication equipment. In such instances, the presence of EMI may cause a diminution in the operation and performance of the equipment.

Both the sophistication and the speed of electronic equipment and devices has increased significantly in recent years due to advances in the capabilities of microprocessor technology in both speed and circuit density. Connectors and interconnections for such equipment, and in particular, for coaxial cable, have seen similar increases in pin count and density requirements. For example, with reference to U.S. Pat. No. 5,190,473 there is described an MCCC which, in an embodiment, makes use of sixteen coaxial cables connected to a like number of contacts via a plug. Other, similar devices known in the art typically make use of twenty contacts attached to twenty coaxial cables via a shielded plug.

In the high-speed electronic applications requiring coaxial cable, the interconnection scheme must maintain acceptable levels of signal integrity, particularly with respect to crosstalk, shielding and controlled impedance. Providing this performance requires that the connector introduces minimal effects on the consistency of the impedance and shielding of the cable through the connector and across the separable interface.

In the context of wireless communication equipment, such as wireless phones, use of MCCCs often requires the coupling of elements by coaxial cables which need pass through the flexible hinge of a phone. Unfortunately, coaxial cable, even micro-coaxial cable, is subject to breakage and structural failure when exposed to repeated bending.

Optical fiber, while more resistant to repeated bending, requires conversion from an optical to an electrical signal when utilized to interface with a printed circuit board. In addition, the transmission of an optical signal does not give rise to EMI. Unfortunately, the ability of system elements, such as entertainment devices, to perform OE or EO conversion often requires the addition of specialized hardware to the elements. Typically, such hardware must be incorporated into the devices adding both additional cost and complexity.

The use of a connector for coupling elements, such as circuit boards, via a conductive medium that does not produce excessive EMI is desired.

SUMMARY OF THE EMBODIMENTS

The foregoing and other problems are overcome, and other advantages are realized, in accordance with the presently preferred embodiments of these teachings.

In accordance with an embodiment of the invention, a connector pair comprises a receptacle comprising an inner cavity about which is arranged a plurality of contact springs each of which is coupled to a corresponding one of a plurality of external contacts and a plug comprising a plurality of contact pads upon an outer surface of the plug, and a vertical cavity surface emitting laser (VCSEL) coupled to the plurality of contact pads and at least one optical fiber wherein a portion of the plug occupies a portion of the inner cavity such that at least one of the plurality of contact pads is coupled to at least one of the contact springs.

In accordance with an embodiment of the invention, a method comprises transmitting an optical signal through at least one optical fiber to a plug comprising a VCSEL the plug coupled to a receptacle comprising a plurality of external contacts, converting the optical signal to an electrical signal via the operation of the VCSEL, and transmitting the electrical signal to the plurality of external contacts.

In accordance with an embodiment of the invention, a method comprises transmitting an electrical signal to a receptacle via a plurality of external contacts coupled to the receptacle the receptacle coupled to a plug comprising a VCSEL, converting the electrical signal to an optical signal via the operation of the VCSEL, and transmitting an optical signal through at least one optical fiber.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION

Figure 1:
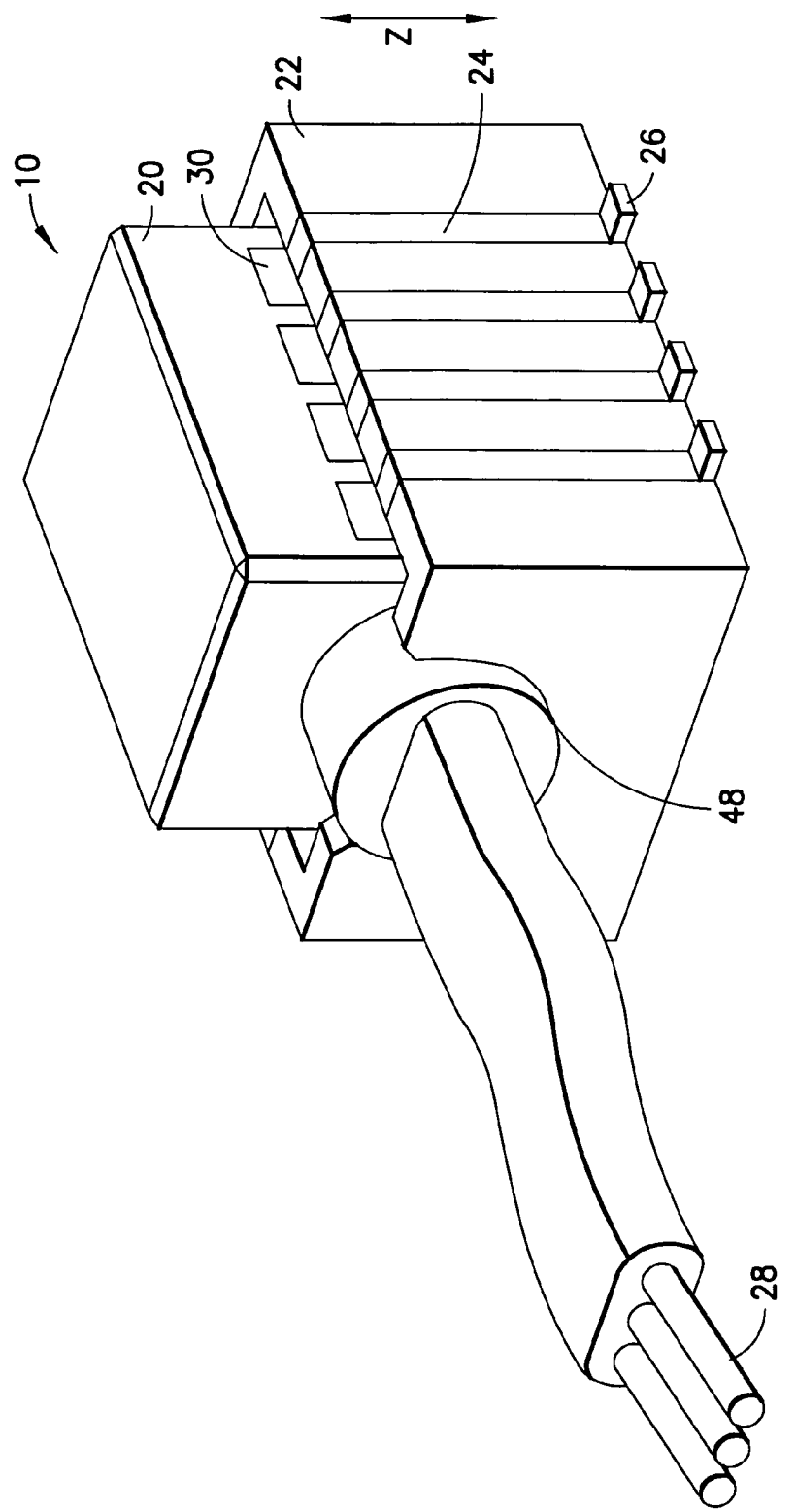
FIG. 1 is a perspective illustration of an embodiment of the connector pair.

With reference to FIG. 1, there is presented a perspective illustration of an embodiment of the invention. Connector pair 10 is formed of a plug 20 coupled to receptacle 22. As receptacle 22 is preferably a surface mount device (SMD), connector pair 10 is described herein in relation to a generally planar surface (not shown), typically a printed wire board (PWB) or the like, upon which rests a generally planar surface of receptacle 22.

Figure 2B:
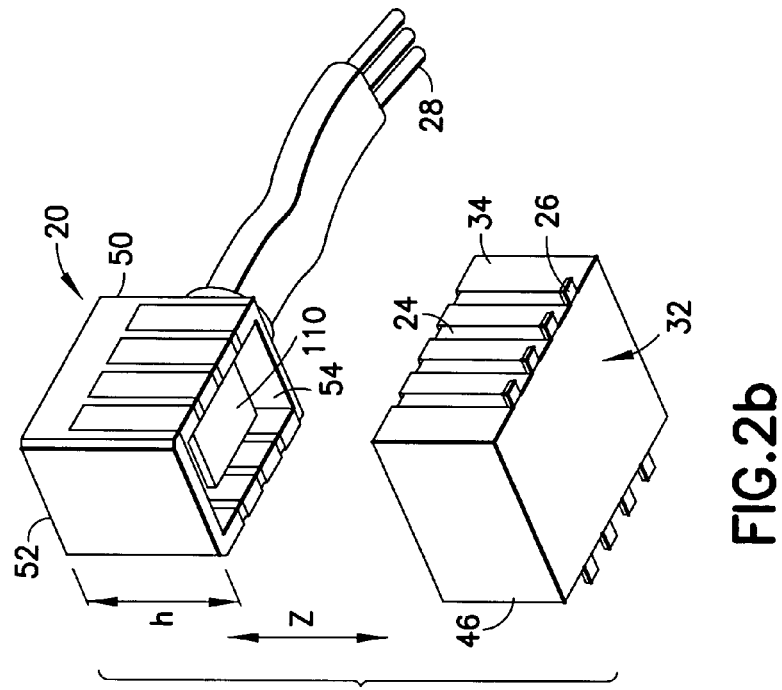
FIG. 2b is a perspective illustration of an embodiment of a plug and a receptacle showing the electrical-optical/optical-electrical (EO/OE) converter.
Figure 2A:
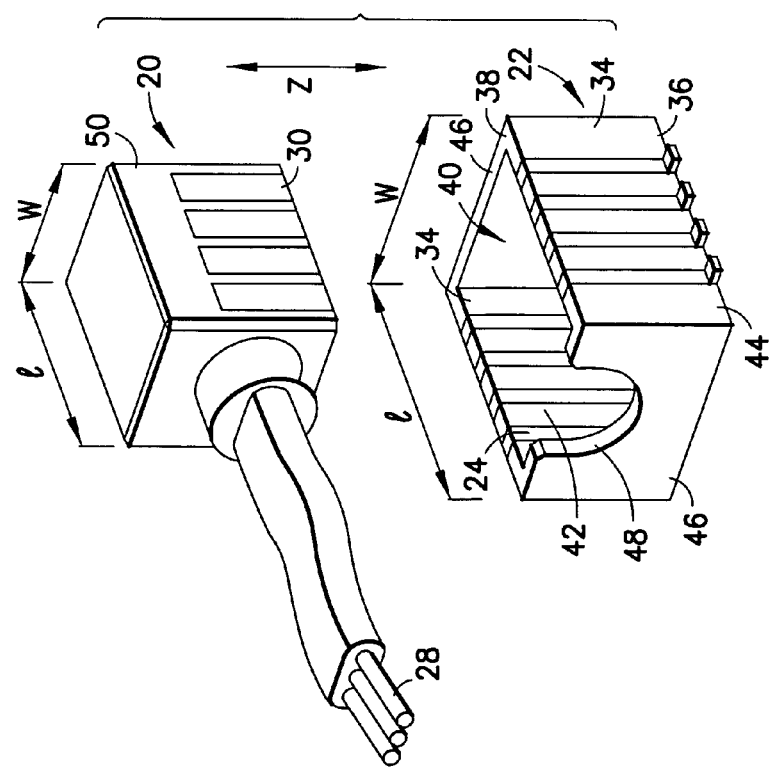
FIG. 2a is a perspective illustration of an embodiment of a plug and a receptacle.

With reference to FIGS. 2a–2b, there are illustrated perspective views of an exemplary embodiment of the receptacle 22 and the plug 20. Receptacle 22 is formed of a generally planar, preferably rectangular, contact surface 32. Side walls 34 extend in parallel opposition away from contact surface 32 with a first edge 36 of each side wall 34 extending along an opposing edge of contact surface 32. As such, the side walls 34 in contact with the contact surface 32, define an inner cavity 40. As a result, each sidewall 34 has an inner side 42 facing into inner cavity 40 and an opposing outer side 44. Preferably, each sidewall 34 extends for an approximately equal length l along contact surface 32. While described herein with receptacle 22 having an inner cavity into which is inserted plug 20, it is possible that plug 20 could be formed to have an inner cavity for mating with the receptacle 22.

One or more contact springs are attached in parallel to at least one, preferably both, inner sides 42 of sidewalls 34. Preferably, an equal number of contact springs 24 are affixed to each inner side 42 extending, generally, perpendicular to contact surface 32 along an axis z. Each contact spring 24 extends away from contact surface 32, over a second edge 38 of a sidewall 34, and down an outer side 44 of a sidewall 34 to terminate in a contact spring external contact 26. Preferably, contact spring external contacts 26 extend for a distance away from receptacle 22 generally coplanar to contact surface 32. Alternatively, contact spring external contacts 26 may extend under contact surface 32.

While illustrated with reference to contact springs 24 extending along an inner side 42 of a side wall 34, over a second edge 38, and down an outer side 44 of a sidewall 34, each contact spring 24 may proceed through a sidewall 34 or end plate so as to terminate at a contact spring external contact 26.

In an exemplary embodiment, inner cavity 40 is further bounded by end plates 46. End plates 46 are generally planar, rectangular expanses extending across a width w each in contact with opposing edges of contact surface 32. One or both end plates 46 may have an opening 48 providing access through an end plate 46 into the inner cavity 40. In this manner, sidewalls 34, end plates 46, and contact surface 32 interact to form an inner cavity 40 having dimensions of an approximate width w by an approximate length l.

Plug 20 is formed of opposing, parallel, generally rectangular contact sides 50 each extending along a length approximately equal to or marginally less than l, and separated by a width approximately equal to or marginally less than w. Contact sides 50 are coupled by way of plug end plates 52 so as to form a rectangular inner cavity 54 and an outer surface having dimensions approximately equal to or marginally less than width w by length l and extending along axis z for a height h. One or more contact pads 30 are fabricated generally flush with an outer side of contact side 50. The spacing and orientation of contact pads 30 are disposed to effect the coupling of one, and only one, contact pad 30 with a corresponding contact spring 24 when the plug 20 is inserted into the receptacle 22 as described more fully below.

Situated at least partially within inner cavity 54 is a converter 110. Converter 110 may be either an electrical to optical (E/O) converter 110 or an optical to electrical (O/E) converter 110 depending on the connector requirements. An E/O converter 110 is formed, in part, of an optical emitter 62 which is preferably a vertical cavity surface emitting laser (VCSEL) component or other component for emitting an optical signal in response to an electrical input such as a light emitting diode (LED). An E/O converter may make additional use of a VCSEL driver for adjusting the intensity of the optical output of the VCSEL. As such, a connector pair 10 formed with an E/O converter 110 functions to convert electrical signals to optical signals for communication across an optical fiber 28. Similarly, a connector pair may be formed of an OE converter 110. An O/E converter 110 typically employs a photo-detector (PD) in series with an amplifier to convert an incoming optical signal into an electrical signal and to amplify the resulting electrical signal as desired.

The EO/OE converter 110 is mounted within inner cavity 54 and is coupled to each contact pad 30. EO/OE converter 110 may be an SMD type component and may be soldered or otherwise attached inside inner cavity 54. Preferably, each contact pad 30 extends parallel to axis z along an outer side of a contact side 50, around an edge of the contact side 50, and into inner cavity 54. EO/OE converter 110 is coupled to one or more optical fibers 28. Optical fibers 28 extend away from plug 20.

Figure 4:
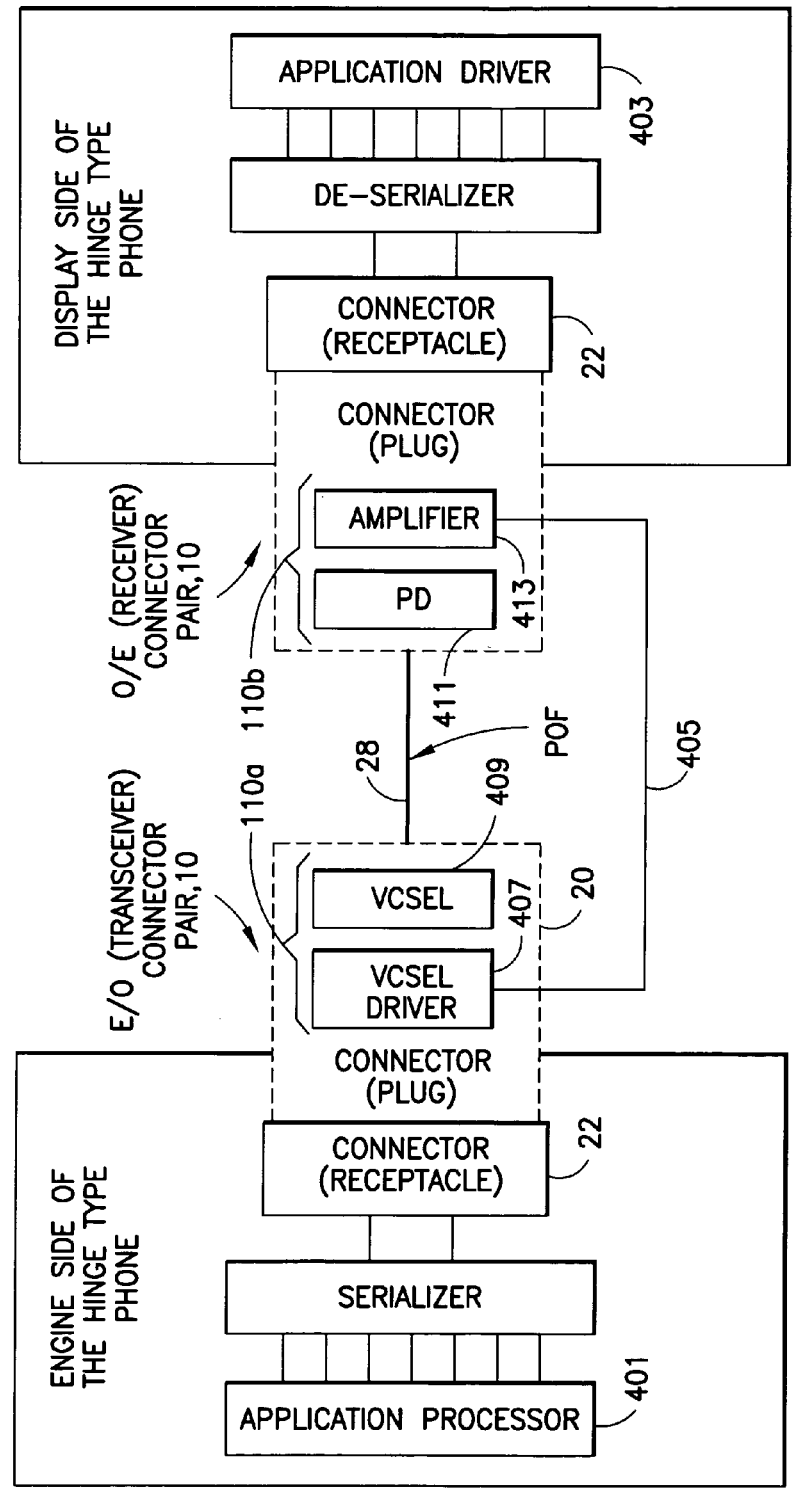
FIG. 4 is a schematic diagram of the EO/OE converter.

With reference to FIG. 4, there is illustrated a schematic diagram of an exemplary embodiment of the invention showing the EO/OE converter 110. Electronic data travels from an application processor 401 to an application driver 403 of a phone via a first connector pair 10 having an E/O converter 110a, an optical fiber 28, and a second connector pair 10 having an O/E converter 110b. The first connector pair 10 receives an electronic signal at its connector 22 which is transmitted to the plug 20 formed of the converter 110a. As discussed above, converter 110a makes use of a VCSEL driver 407 for modulating the intensity of the optical signal forming the output of the VCSEL 409. Converter 110b makes use of a photo-detector 411 for converting the incoming optical signal to an electronic signal. As noted, an amplifier 413 may be used to amplify the optical signal converted by photo-detector 411 into an electrical signal. The electrical signal is then transmitted to the application driver 403.

In an exemplary additional embodiment, a feedback loop is employed to provide feedback to the VCSEL driver 407. Preferably, the feedback loop 405 originates at a point after the amplifier 413 and senses the amount of amplification required to produce a signal from the photo-detector 411 suitable for use by the application driver 403. Feedback loop 405 transmits this amount via a feedback signal to VCSEL driver 407 via feedback loop 405. VCSEL driver 407 may then modulate the intensity at which the VCSEL 409 operates such that the end to end transmission of data between connector pairs 10 does not suffer from an undesirable amount of noise or other interference.

With continued reference to FIG. 1, there is illustrated an exemplary configuration of connector pair 10 wherein plug 20 is mated to receptacle 22. As is evident, when plug 20 is inserted along axis z into inner cavity 40 of receptacle 22, each contact pad 30 is pressed in contact against a corresponding contact spring 24. Optical fibers 28 extend away from connector pair 10 through opening 48.

Once mated, plug 20 and receptacle 22 form connector pair 10. In such a configuration, an optical data signal may travel along an optical fiber 28 to EO/OE converter 110 situated inside of plug 20. As shown, optical fiber 28 passes through opening 48 of receptacle 22. EO/OE converter 110 converts the optical data signal from an optical signal to an electrical signal or from an electrical signal to an optical signal. The electrical signal is communicated by EO/OE converter 110 to one or more contact pads 30. The electrical signal is communicated over one or more contact springs 24, each in contact with a contact pad 30, to one or more contact spring external contact 26. The electrical signal is then communicated, via contact spring external contacts 26, to a PWB or other device having electrical contacts. In instances where bi-directional communication is required between components, two or more optical fibers 28 may be employed with each optical fiber 28 similarly terminated at either end by an opposing E/O connector pair 10 and an O/E connector pair 10 oriented such that data flows opposite that of mono-directional data flow described with reference to FIG. 4.

Figure 3:
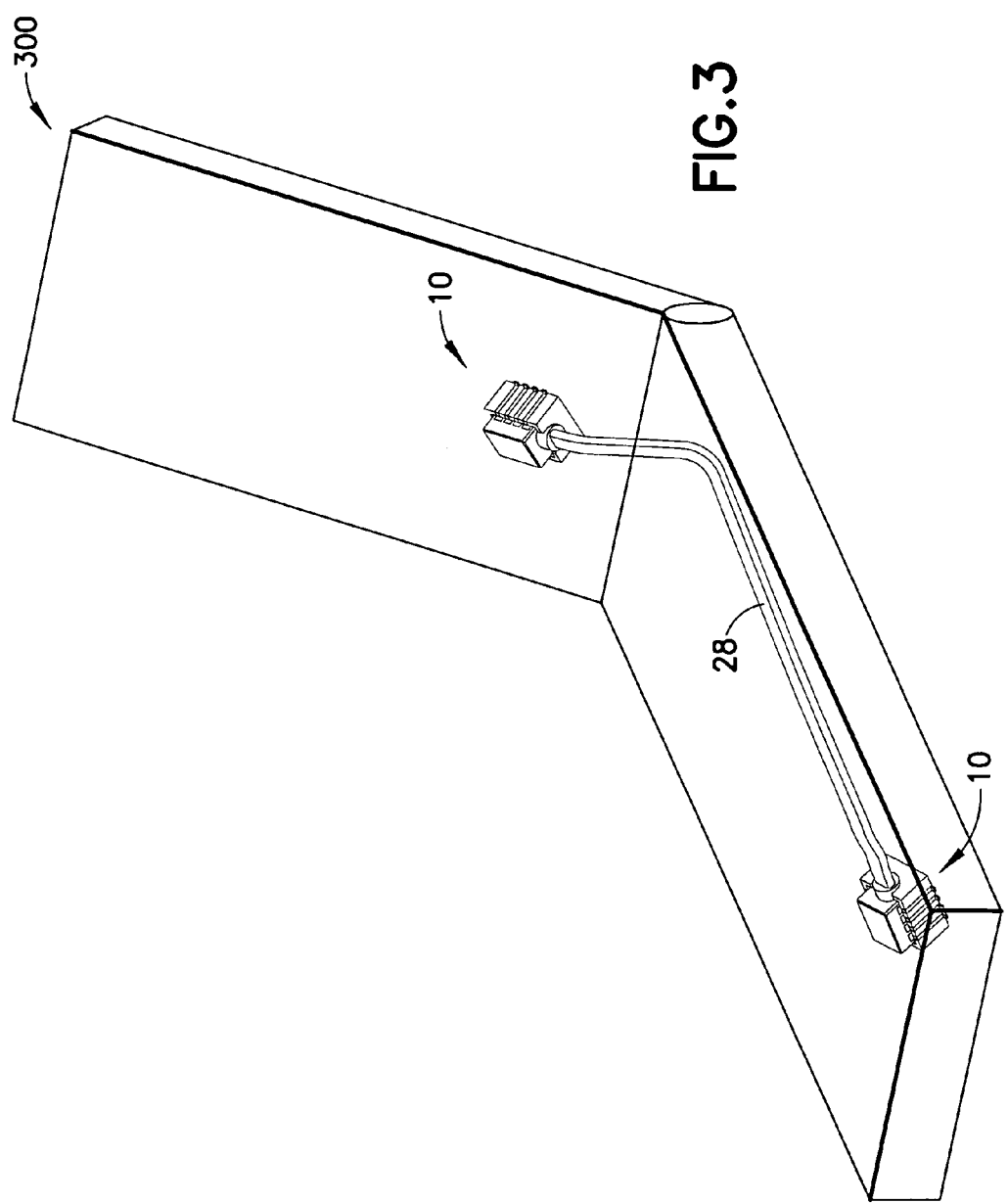
FIG. 3 is an illustration of an embodiment of the connector pair utilized in a wireless communication device.

With reference to FIG. 3, there is illustrated an exemplary embodiment of an optical fiber 28 extending between two connector pairs 10 and extending through the hinge of a wireless transceiver, or cell phone 300. In such a configuration, data can be sent between connector pairs 10 using optical signals traveling along optical fiber 28. Use of optical fibers 28 eliminates the presence of EMI present when communicating via electrical signals.

Figure 5B:
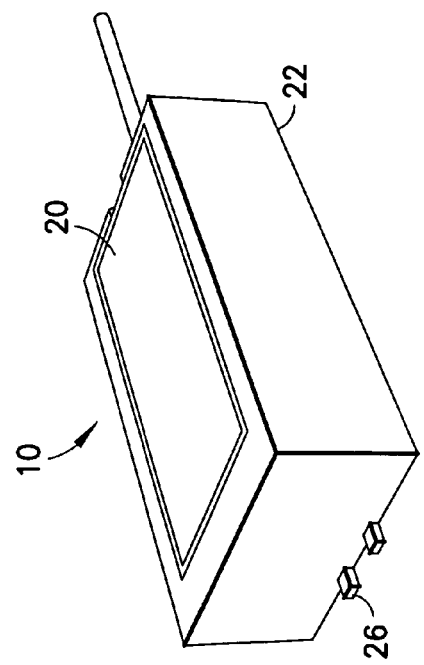
FIG. 5b is a perspective illustration of an exemplary embodiment of a connector pair mated together.
Figure 5A:
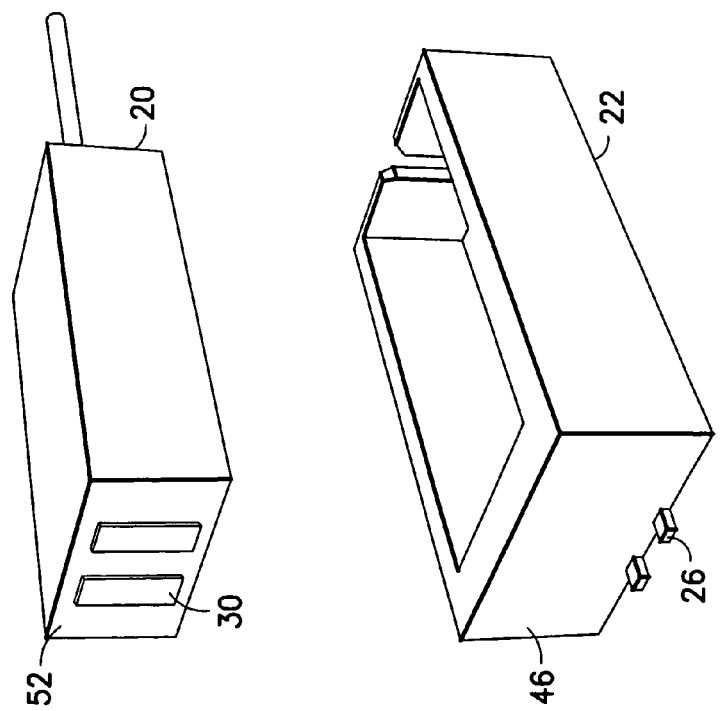
FIG. 5a is a perspective illustration of an exemplary embodiment of a connector pair prior to mating.

With reference to FIGS. 5a and 5b, there is illustrated an exemplary alternative embodiment of a connector pair 10. Note that external contacts 26 extend through end plate 46 to contact springs 24 (not shown). Similarly, contact pads 30 are affixed to a plug end plate 52. Note further that the number of contact springs 24 is two per connector pair 10. Exemplary measurements for the outside dimensions of receptacle 22 are approximately 7.5 mm in length, approximately 4.2 mm in width, and approximately 2.0 mm in height.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

What is claimed is:

1. A connector pair comprising:
   a receptacle comprising an inner cavity about which is arranged a plurality of contact springs each of which is coupled to a corresponding one of a plurality of external contacts; and
   a plug comprising:
      a plurality of contact pads upon an outer surface of said plug; and
      a signal converter coupled to said plurality of contact pads and at least one optical fiber;
   wherein a portion of said plug occupies a portion of said inner cavity such that at least one of said plurality of contact pads is coupled to at least one of said contact springs.

2. The connector pair of claim 1 wherein said receptacle comprises a generally planar contact surface.

3. The connector pair of claim 2 wherein said contact surface is rectangular.

4. The connector pair of claim 3 wherein said receptacle comprises a first edge and an opposing second edge, a first sidewall extending from said first side, and a second sidewall extending from said second edge.

5. The connector pair of claim 4 wherein said plurality of contact springs are arranged upon said first and second sidewalls.

6. The connector pair of claim 1 wherein said signal converter comprises an electrical-optical (EO) converter.

7. The connector pair of claim 6 wherein said signal converter comprises a vertical cavity surface emitting laser (VCSEL) and a VCSEL driver.

8. The connector pair of claim 1 wherein said at least one optical fiber extends through a wireless communication device.

9. The connector pair of claim 8 wherein said at least one optical fiber extends through a hinge of a wireless communication device.

10. The connector pair of claim 1 wherein said signal converter comprises an optical-electric (OE) converter.

11. The connector pair of claim 1 wherein at least one of said plurality of external contacts is coupled to a printed wire board (PWB).

12. A method comprising:
    transmitting a first electrical signal to a first receptacle coupled to a first plug comprising an EO converter, said first plug coupled to an optical fiber;
    converting said electrical signal to an optical signal via the operation of said EO converter;
    transmitting said optical signal over said optical fiber to a second plug comprising an OE converter and coupled to a second receptacle comprising a plurality of external contacts;
    converting said optical signal to a second electrical signal via the operation of said OE converter; and
    transmitting a feedback signal from said OE converter to said EO converter.

13. The method of claim 12 further comprising transmitting said second electrical signal to said plurality of external contacts.

14. The method of claim 12 wherein said feedback signal is utilized to control an operation of said EO converter.

15. The method of claim 12 further comprising transmitting said second electrical signal to a PWB via said plurality of external contacts.

16. A method comprising:
    transmitting a first electrical signal to a first receptacle coupled to a first plug comprising an EO converter said first plug coupled to an optical fiber;
    converting said electrical signal to an optical signal via the operation of said EO converter;
    transmitting said optical signal over said optical fiber to a second plug comprising an OE converter and coupled to a second receptacle comprising a plurality of external contacts;
    converting said optical signal to a second electrical signal via the operation of said OE converter; and
    transmitting said second electrical signal to said plurality of external contacts;
    wherein transmitting said second electrical signal comprises transmitting said second electrical signal through a plurality of contact pads affixed to said second plug, to a plurality of contact springs coupled to said second receptacle, and to said plurality of external contacts.

17. A method comprising:
    transmitting an optical signal to a plug comprising an OE converter via an optical fiber said plug coupled to a receptacle;
    converting said optical signal to an electrical signal via the operation of said EO converter;
    transmitting a feedback signal from said OE converter to said EO converter; and
    transmitting said electrical signal to said receptacle.

18. A method comprising:
    transmitting an electrical signal to a receptacle via a plurality of external contacts coupled to said receptacle said receptacle coupled to a plug comprising an EO converter;
    utilizing a feedback signal to convert said electrical signal to an optical signal via the operation of said EO converter; and
    transmitting an optical signal through at least one optical fiber.

19. An apparatus comprising:
a first connector pair comprising a first plug comprising an EO converter coupled to a first receptacle;
a second connector pair comprising a second plug comprising an OE converter coupled to a second receptacle;
an optical fiber coupled to said first and second plug for transmitting an output of said EO converter as an input to said OE converter; and
a feedback loop coupled to said first plug and said second plug.

20. The apparatus of claim 19 wherein said EO converter comprises a VCSEL.

21. The apparatus of claim 20 wherein said EO converter comprises a VCSEL driver.

* * * * *